(12) United States Patent
Davies

(10) Patent No.: US 8,584,117 B2
(45) Date of Patent: Nov. 12, 2013

(54) METHOD TO MAKE SMP/E BASED PRODUCTS SELF DESCRIBING

(75) Inventor: David Davies, Felton, CA (US)

(73) Assignee: BMC Software, Inc., Houston, TX (US)

(*) Notice: Subject to any disclaimer, the term of this patent is extended or adjusted under 35 U.S.C. 154(b) by 980 days.

(21) Appl. No.: 12/506,842

(22) Filed: Jul. 21, 2009

(65) Prior Publication Data

US 2010/0146498 A1    Jun. 10, 2010

Related U.S. Application Data

(60) Provisional application No. 61/121,393, filed on Dec. 10, 2008.

(51) Int. Cl.
*G06F 9/445* (2006.01)

(52) U.S. Cl.
USPC .......................................................... 717/174

(58) Field of Classification Search
None
See application file for complete search history.

(56) References Cited

U.S. PATENT DOCUMENTS

| | | | |
|---|---|---|---|
| 7,234,118 B1* | 6/2007 | Bleizeffer et al. | 715/764 |
| 7,503,041 B2* | 3/2009 | Butterweck et al. | 717/168 |
| 7,823,148 B2 | 10/2010 | Deshpande et al. | |
| 8,464,246 B2 | 6/2013 | Davies et al. | |
| 2001/0011305 A1 | 8/2001 | Barker | |
| 2002/0013939 A1* | 1/2002 | Daynes et al. | 717/11 |
| 2002/0091723 A1* | 7/2002 | Traner et al. | 707/205 |
| 2005/0066324 A1 | 3/2005 | Delgado et al. | |
| 2005/0257214 A1* | 11/2005 | Moshir et al. | 717/171 |
| 2008/0163192 A1 | 7/2008 | Jha et al. | |

OTHER PUBLICATIONS

IBM, "SMP/E User's Guide", First Edition, Mar. 2001, 17 pages.

* cited by examiner

*Primary Examiner* — Henry Tsai
*Assistant Examiner* — Juanito Borromeo

(57) ABSTRACT

Systems and methods of providing information from run-time installations of mainframe SMP/E based products. Information is embedded into a fingerprint library. The fingerprint library may then be associated with a product installed via SMP/E. The fingerprint library may then remain with the product when it is copied to its distributed location. A system administrator may later query the run-time installation and retrieve information previously only known to the SMP/E tool in an SMP/E controlled installation. In one embodiment, information may be embedded into a fingerprint library at product build time.

20 Claims, 7 Drawing Sheets

METHOD TO MAKE SMP/E BASED PRODUCTS SELF DESCRIBING

CROSS REFERENCE TO RELATED APPLICATIONS

This Application claims priority to U.S. Provisional Application Ser. No. 61/121,393 entitled "A Method To Make SMP/E Based Products Self Describing" filed 10 Dec. 2008 and which is incorporated by reference in its entirety herein.

BACKGROUND

This disclosure relates generally to the field of distributed mainframe software management. More particularly, but not by way of limitation, to a method of providing tracking information for SMP/E based mainframe products at their run-time location.

System Modification Program/Extend (SMP/E) is a shared utility used in conjunction with the z/OS operating system provided by International Business Machines Corporation (IBM) of Armonk N.Y. (z/OS is a registered trademark of the International Business Machines corporation.) SMP/E is the common installation tool for managing operating system components and middleware on z/OS. SMP/E may be used to manage multiple software versions, apply patches and updates, facilitate orderly testing and (if necessary) reversion to a previous state, allow a "trial run" pseudo-installation to verify that actual installation will work, keep audit and security records to assure only approved software updates occur, and otherwise provide centralized control over software installation on z/OS.

Although it is possible to design and ship software products that install on z/OS without SMP/E, most mainframe administrators prefer SMP/E-enabled products, at least for non-trivial packages. Using SMP/E typically requires some working knowledge of Job Control Language (JCL), although most products supply sample JCL. The rigorous software management discipline associated with SMP/E typically extends to product documentation as well, with IBM and other vendors supplying a standardized "Program Directory" manual for each software product that precisely aligns with the SMP/E work processes. The Program Directory provides detailed information on pre-requisites and co-requisites, for example.

Today most Mainframe installations install IBM and other Independent Software Vendor (ISV) products using SMP/E because SMP/E facilitates the download of files/libraries to disk and effectively manages and tracks the maintenance of those libraries. However, mainframe SMP/E based products do not inherently provide a uniform set of fingerprints (e.g., tracking information) within the product libraries themselves. Because of this, a system administrator cannot uniformly query installed product libraries to determine the product description, version, release, or maintenance level without the help of SMP/E itself.

Typically an IT department using SMP/E would install a product in one location once and maintain the level of the contents in that location. Also, companies sometimes do not execute products from the install set of libraries. Instead, it is common for a system administrator to copy the full set of run-time libraries to several locations (sometimes hundreds) via simple copy utilities and allow respective products to execute from those locations. Licensing of products is handled separately from the actual location of a product's installed run-time libraries. At the location where the products are executed the copied libraries are no longer maintained via SMP/E and thus SMP/E cannot be used to query the contents of the execution libraries.

In light of these and other operational shortcomings of SMP/E, there is a need for a method and system to automatically generate and embed information that is, in-turn, made available to SMP/E at product installation time. This causes the actual product's libraries to contain this information that may later be queried regardless of how the run-time versions of the product libraries were distributed. In other words, there is a need to make SMP/E based products self-describing so that a system administrator may query a set of product libraries and determine installation information without SMP/E being involved.

SUMMARY

In one embodiment a mainframe computer is disclosed. The mainframe computer includes a programmable control device and a program build environment configured to generate a fingerprint library which may subsequently be made available for installation in a system modification program extend (SMP/E) environment. The programmable control device is programmed to execute the build function and collect or detect product function attributes. Next, the information collected and detected is converted into a structured format for inclusion into a fingerprint library. This fingerprint library, containing product function attributes, may then be included in an installation bundle which will subsequently be provided as input to SMP/E. The fingerprint library is installed and maintained as part of the original installation bundle. Later, a subsequent function may then detect information made available via the fingerprint library from the run-time product location without SMP/E being involved.

In another embodiment, a method of maintaining product function attributes information across multiple logical partitions (LPARs) of a mainframe environment is disclosed. The method comprises receiving on a second LPAR a copy of a result of installing an installation bundle on a first LPAR, wherein the first LPAR was installed via SMP/E. Next, the method allows for querying files on the second LPAR to detect one or more fingerprint libraries and extract information from the one or more fingerprint libraries. After the information is extracted, at least a portion of the information may be returned to a system administrator, an end user, or even another application for further processing.

In yet another embodiment, a computer network of LPARs collectively includes embedded information in fingerprint libraries; maintaining some of the LPARs with SMP/E and others exclusive of SMP/E; and querying an environment where SMP/E is not available to obtain a result of product function attributes information from the information embedded in the fingerprint library.

DETAILED DESCRIPTION

Figure 1:
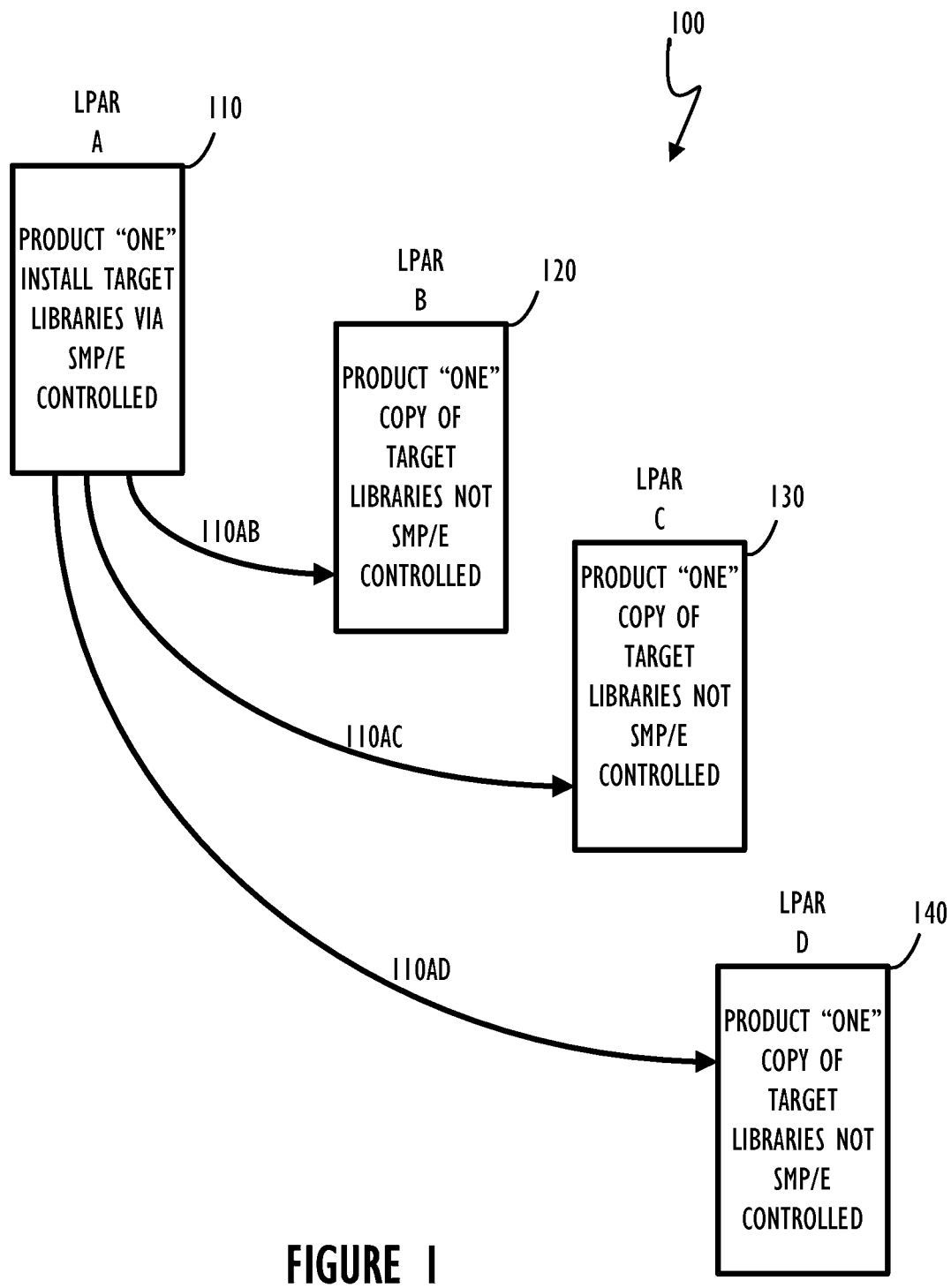
FIG. 1 shows, in block diagram form, an example of products installed without a software fingerprint by way of a fingerprint library.

Methods and systems to maintain content information for SMP/E installed run-time mainframe products, patches, and libraries are described. The disclosed system and method generate an additional fingerprint library. As used herein, a fingerprint library refers to a mainframe file formatted to appear as a real library but containing at least a portion with no executable instructions for its associated product. The disclosed fingerprint library may be generated at product build time (and shipped with the product). Information formatted to maintain product tracking information, as described below, may be embedded into the fingerprint library and this fingerprint library may subsequently be treated as a required part of the product's run-time environment. In order to accomplish this it may be necessary to follow a pre-defined file naming convention for the fingerprint library and to ensure that the fingerprint library is placed in a location consistent with the product being installed.

To aid in the understanding of this disclosure the following information about acronyms associated with SMP/E is provided. An APAR (authorized program analysis report) is a term used to denote a description of a problem with a program that is formally tracked until a solution is provided. An APAR is created or "opened" after a customer (or sometimes IBM itself) discovers a problem that IBM determines is due to a bug in IBM's program/application code. The APAR is given a unique number for tracking and a target date for solution. When the support group that maintains the code solves the problem, it develops a program temporary fix (PTF) that, when applied, possibly with a SuperZap, will temporarily solve the problem for the customers that may be affected. The PTF will "close" the APAR. PTFs can be applied individually but are usually made available as part of a fix package that includes a number of PTFs. Meanwhile, the PTFs are provided to the development group that is working on the next product release. These developers may or may not use the PTFs (since these are temporary fixes), but will determine and design a correct problem solution to incorporate in the next product release.

A system modification (SYSMOD) is a collection of software elements that can be individually distributed and installed. The SYSMOD is the input data to SMP/E that defines the introduction, replacement, or update of product function elements for SMP/E processing into target libraries and associated distribution libraries. A modification control statement (MCS) is an SMP/E control statement used to package a SYSMOD. These MCS statements describe the elements of a program and the relationships that program has with other programs that may be installed on the same system.

Relative file format (Relfile) is a SYSMOD packaging method in which elements and JCLIN data are in separate relative files from the MCSs. When SYSMODs are packaged in relative file format, there is a file of MCSs for one or more SYSMODs, and one or more relative files containing unloaded source-code data sets and unloaded link-edited data sets containing executable modules. Relative file format is the typical method used for packaging function SYSMODs. JCLIN may be defined as any of the following:

- The SMP/E process of creating or updating the target zone using JCLIN input data.
- The data set that contains the Stage 1 output from a system, subsystem or product generation, used by SMP/E to update or create the target zone.
- The SMP/E JCLIN command used to read in the JCLIN data.
- The ++JCLIN Statement in a SYSMOD that enables SMP/E to perform the target zone updates during APPLY processing.

JCLIN data refers to the JCL statements associated with the ++JCLIN statement or saved in the SMPJCLIN data set. JCLIN data is used by SMP/E to update the target zone when the SYSMOD is applied. Optionally, JCLIN data can be used by SMP/E to update the distribution zone when the SYSMOD is accepted.

A single physical mainframe computer may be subdivided into multiple Logical Partitions (LPARs). A LPAR is a logical segmentation of a mainframe's memory and other resources that allows it to run its own copy of an operating system and associated applications. LPAR's may be enabled via special hardware circuits or purely through software. LPAR's may also allow multiple system images (of the same operating system or different operating systems) to run in one machine.

By embedding pertinent metadata, that is currently only available at the time and location of an initial SMP/E based installation, system administrators can better manage a complex multiplicity of installations (e.g., LPARs) more easily. Those of ordinary skill in the art will recognize that the actual format internal to a fingerprint library may resemble XML or any other structure suitable for maintaining/retaining data/metadata in an efficient manner. This additional fingerprint library may be generated and delivered by the software vendor and treated as if it were a product update. Therefore, there is no need for all software vendors to conform to any additional requirements for the disclosed method and system to comprehensively manage all software installed via SMP/E.

In the embodiments disclosed herein, the fingerprint library is described as a standalone (i.e., separate) library. However, those of ordinary skill in the art will recognize that a fingerprint library portion may also be included inside another library or file and provide similar capabilities to those disclosed herein. Also, in the embodiments disclosed herein the metadata is formatted in extensible Markup Language (XML). Those of ordinary skill in the art will recognize that other forms of data encoding may also be used. Examples of possible XML content and schema for different product granularity are shown toward later in this disclosure.

Referring now to FIG. 1, a block diagram 100 is shown describing an example of a product (e.g., named product "ONE") installed without a software fingerprint by way of a fingerprint library. Block 110 represents a mainframe instance controlled via SMP/E. As described above, a system administrator may install a product into a first LPAR 110 and then simply copy the installed libraries to additional LPAR's 120, 130 and 140 as needed. This is done mainly for convenience because copying an already installed application may be easier than executing SMP/E multiple times on multiple LPAR's. Also, the overhead of executing SMP/E to perform each installation may introduce more overhead for the system administrator as the number of LPAR's increases beyond the simplified four (4) LPAR's of this example. It is not uncommon for a single organization to have dozens or even hundreds of LPAR's to manage so the overhead of running SMP/E for each LPAR may become overwhelming.

In FIG. 1 (prior art), the act of copying from LPAR A (110) to LPAR B (120) is represented by arrow 110AB. Arrows 110AC and 110AD similarly represent the act of copying to LPAR C 130 and LPAR D 140 respectively. Because these different acts of copying may happen at different times, it is possible for each LPAR's installation image to be inconsistent with the other LPAR's. This will happen if the system administrator utilizes SMP/E to install a patch (e.g., PTF) to LPAR A (110) and only copies the updated product install libraries as indicated by 110AB to LPAR B (120). At this point in time LPAR A 110 and LPAR B 120 will be consistent with each other but will be different from LPAR C 130 and LPAR D 140. Over time it is possible for each of the systems to be out of sync with each other and the system administrator may lose knowledge of what versions of product libraries are on LPAR's B, C and D (120, 130 and 140) because these product libraries were simply copied and are not SMP/E controlled.

Figure 2:
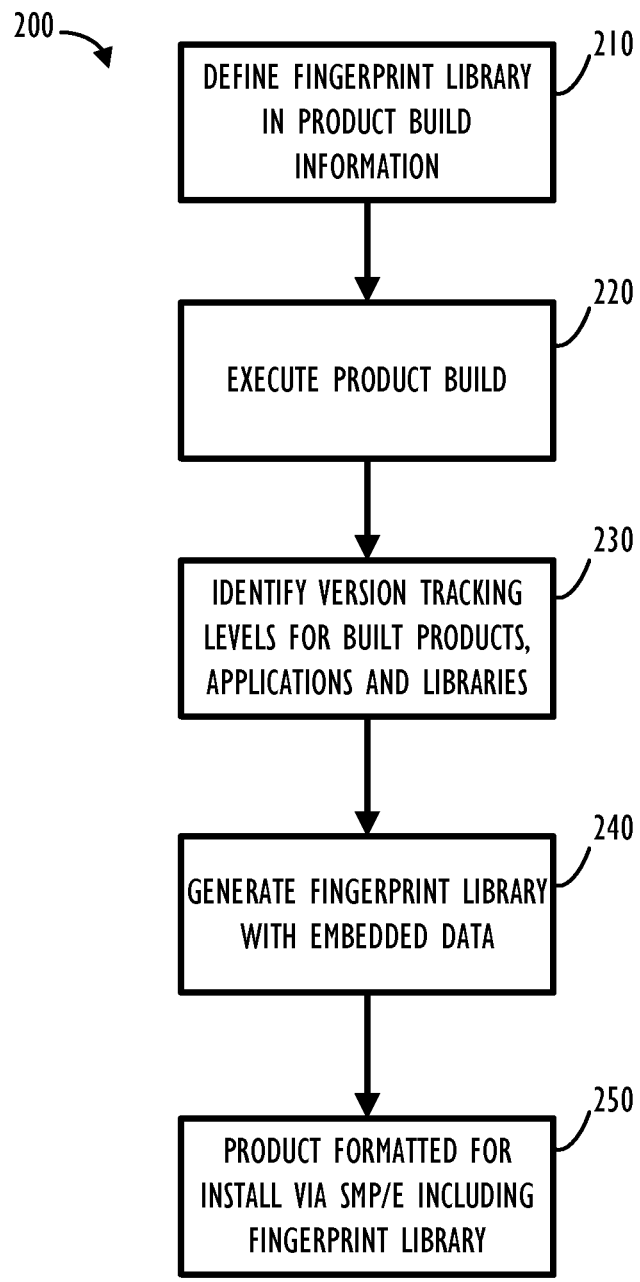
FIG. 2 shows, in flow chart form, an embodiment where a fingerprint library is generated at product build time and the resultant product includes a software fingerprint.

Referring now to FIG. 2, a process flow 200 for one embodiment is shown where a fingerprint library is generated at product build time. Process 200 begins at block 210 where a fingerprint library is defined in product build information. Those of ordinary skill in the art will recognize that product builds are typically controlled by configuration files supplying instructions on how to build the product. By defining the fingerprint library as part of the standard build process (block 210) the fingerprint library may more easily be treated as a required library for a successful product build (and subsequent installation). At block 220 a standard product build is performed by a user (e.g., application developer, application tester or production build engineer). In the course of a product build it may be possible to determine some product function attributes information for the built product (block 230). The product function attributes information may include, but need not be limited to, time of build, version of product, version of patch, version of source code, etc. Next, at block 240 a fingerprint library may be created to contain embedded XML data reflecting the desired portions of the determined product function attributes information. Those of ordinary skill in the art will recognize that this library may be generated in many different ways including compilation from generated source code or editing a pre-existing binary library to insert information, among others. In any case the fingerprint library may be treated as a normal required library for the product being built. Finally, at block 250 the built product is formatted for normal installation via SMP/E.

Figure 3:
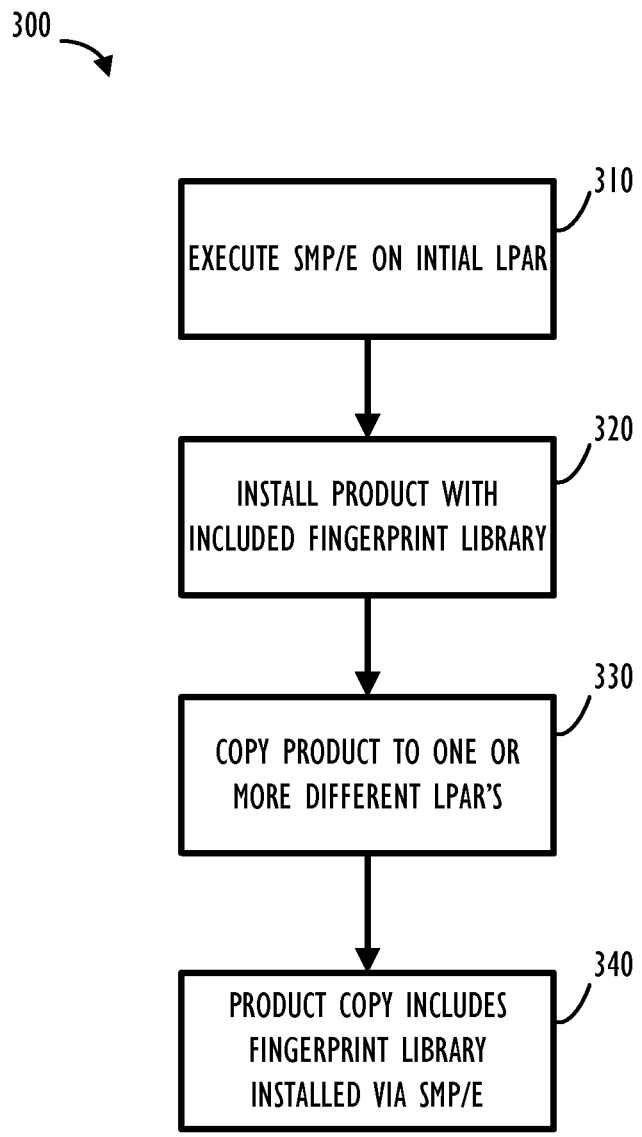
FIG. 3 shows, in flowchart form, an embodiment where a fingerprint library is included at product install time and the resultant install image and distributed images include a software fingerprint.

FIG. 3 shows a process flow 300 for an alternate embodiment where a fingerprint library is included at initial product installation time via SMP/E. Beginning at block 310, an SMP/E installation process is initiated on an initial LPAR. The install bundle comprises a product which includes a fingerprint library. After the product is installed it may be distributed (e.g., copied) to one or more additional LPAR's as indicated by block 330. Finally, at block 340 the installation of the product is completed on the subsequent LPAR's with the fingerprint library having been included with the product as a required library of the product.

Figure 4A:
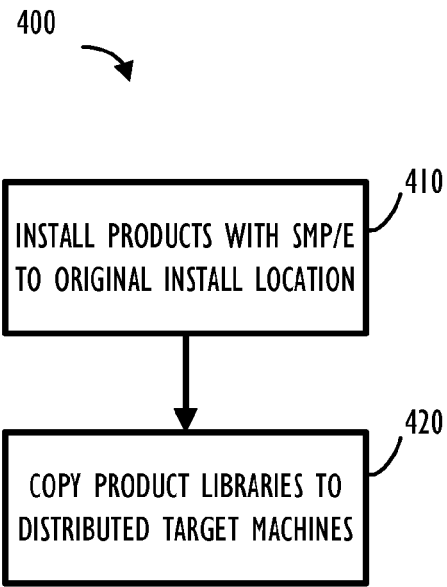
FIG. 4 shows, in flowchart form, an exemplary process for querying information from run-time product locations based on an embodiment disclosed herein.
Figure 4B:
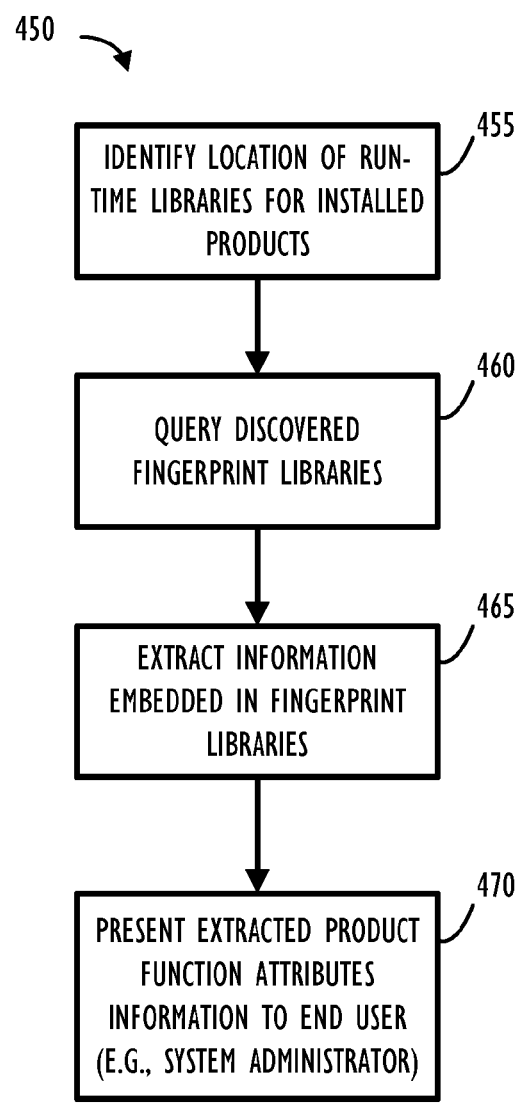

Referring now to FIGS. 4A and 4B, two distinct process flows 400 and 450 are shown to illustrate an overall process flow for one embodiment. Process flow 400 shows a product install via SMP/E (410) to an original SMP/E controlled install location. After the installation is complete, flow continues to block 420 where the system administrator copies the product libraries to one or more other LPARs that are not SMP/E controlled. Process flow 450 is executed later in time and on a different LPAR from process flow 400. Process flow 450 illustrates how a system administrator may later query an installed product to determine version information when that product has an associated fingerprint library. First, at block 455 the location of run-time product libraries is determined. Next, at block 460, the fingerprint libraries that have been maintained through the copy process are queried. The query retrieves the embedded product function attributes information from inside the fingerprint library as shown at block 465. Finally, at block 470 the extracted product information may be presented to an end user or sent to another location for further processing.

Figure 5:
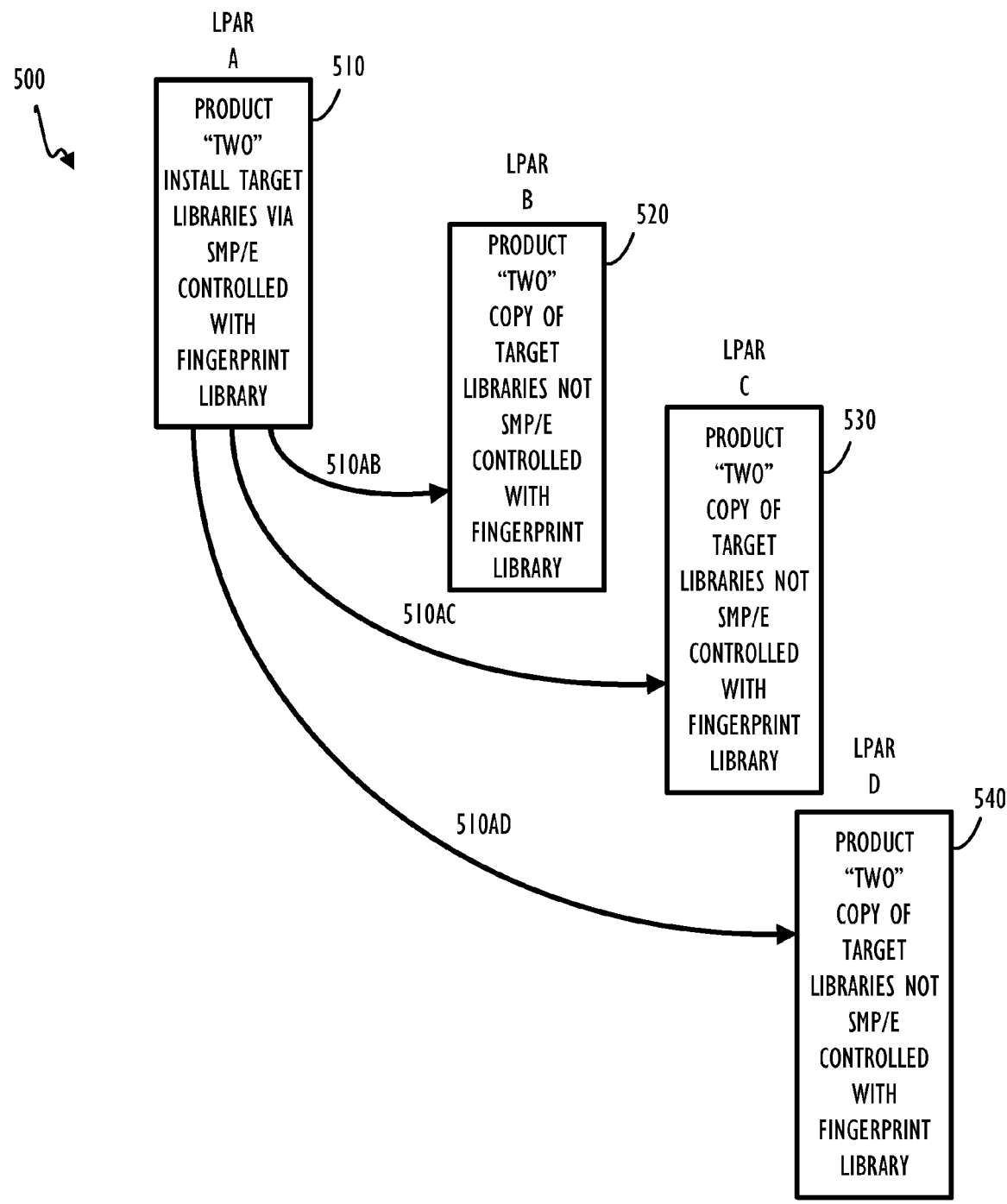
FIG. 5 shows, in block diagram form, an example of products installed in a distributed mainframe environment with a software fingerprint by way of a fingerprint library.

FIG. 5 illustrates block diagram 500 showing a similar scenario to that described in FIG. 1, however, in this scenario the example product (e.g., named product "TWO") has been enhanced to include a fingerprint library with product function attributes information. LPAR A (510) represents an LPAR that is SMP/E controlled and utilized to initially install a product. LPARs B, C and D (520, 530 and 540) represent LPARs that are not SMP/E controlled and will receive copies of the product installed on LPAR A (510). One of ordinary skill in the art will recognize, given the benefit of this disclosure, that each of LPARs B, C and D (520, 530 and 540) contain embedded information that reflects their individual product versions regardless of actions performed on other LPARs. Further, the acts of copying (510AB, 510AC and 510AD) may be performed independently and different levels (i.e., level as determined from product function attributes information) of products may be installed on many combinations and permutations of LPARs without the system administrator losing the ability to determine exact product levels directly from any given LPAR.

Figure 6:
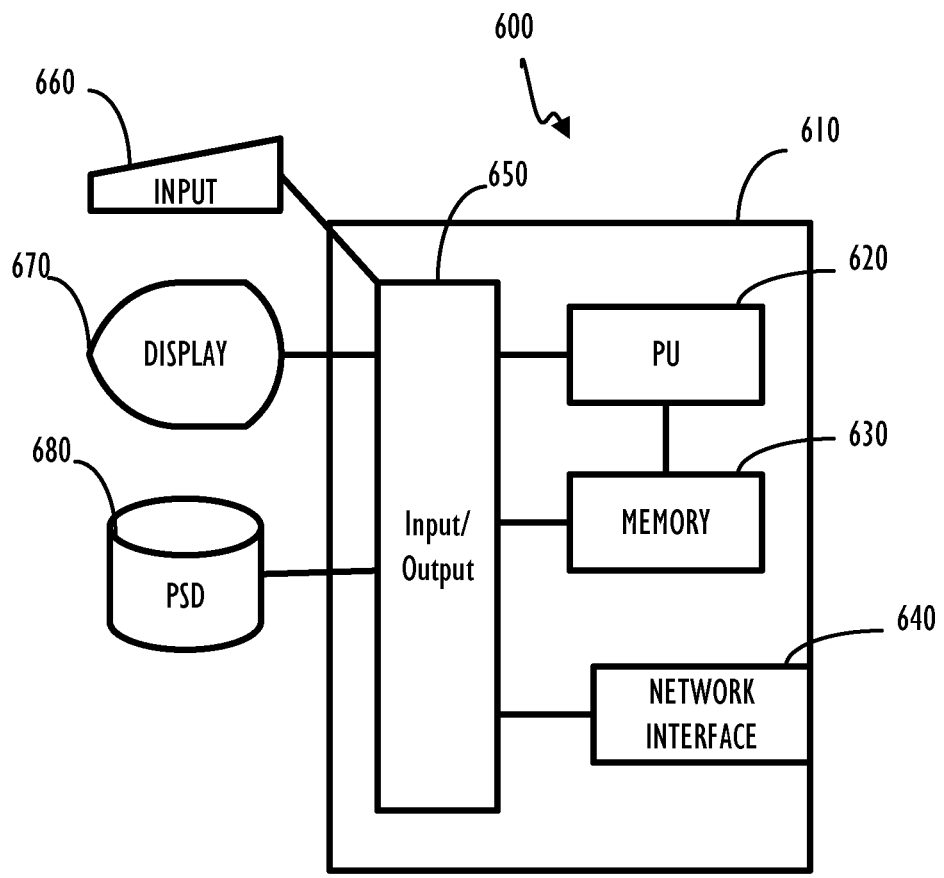
FIG. 6 shows, in block diagram form, an exemplary computing device comprised of a program control device.

Referring now to FIG. 6, an exemplary computing device 600 is shown. One or more exemplary computing devices 600 may be included in a mainframe computer (not shown). Exemplary computing device 600 comprises a programmable control device 610 which may be optionally connected to input 660 (e.g., keyboard, mouse, touch screen, etc.), display 670 or program storage device (PSD) 680 (sometimes referred to as direct access storage device DASD). Also, included with program device 610 is a network interface 640 for communication via a network with other computing and corporate infrastructure devices (not shown). Note network interface 640 may be included within programmable control device 610 or be external to programmable control device 610. In either case, programmable control device 610 will be communicatively coupled to network interface 640. Also note program storage unit 680 represents any form of non-volatile storage including, but not limited to, all forms of optical and magnetic storage elements including solid-state storage.

Program control device 610 may be included in a computing device and be programmed to perform methods in accordance with this disclosure (e.g., those illustrated in FIG. 1-5). Program control device 610 comprises a processor unit (PU) 620, input-output (I/O) interface 650 and memory 630. Processing unit 620 may include any programmable controller device including, for example, processors of an IBM mainframe (such as a quad-core z10 mainframe microprocessor). Alternatively, in non mainframe systems examples of processing unit 620 include the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 630 may include one or more memory modules and comprise random access memory (RAM), read only memory (ROM), programmable read only memory (PROM), programmable read-write memory, and solid state memory. One of ordinary skill in the art will also recognize that PU 620 may also include some internal memory including, for example, cache memory.

Figure 7:
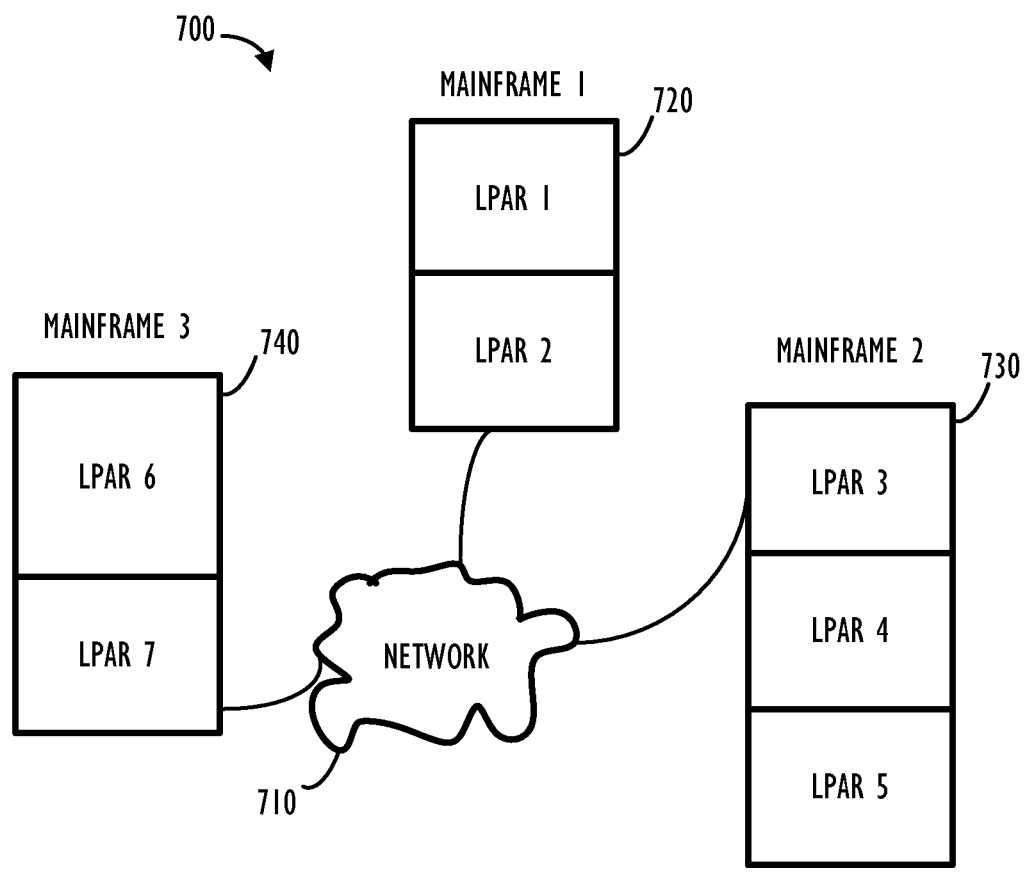
FIG. 7 shows, in block diagram form, an exemplary network of mainframe computers comprised of multiple Logical Partitions (LPARs).

Referring now to FIG. 7, a block diagram of a network multiple mainframe computers 700 is shown. Mainframe 1 (720) and mainframe 3 (740) each consist of two LPARs and mainframe 2 (730) consists of three LPARs. Each of these systems is connected via network 710 to each other and to other corporate infrastructure devices (not shown). Computer network 700 therefore depicts an example of seven LPARs (1-7). Also, each of these seven LPARs may correspond to LPARs A-D as shown in FIGS. 1 (110, 120, 130, 140) and 5 (510, 520, 530, 540) and benefit from the embodiments disclosed herein.

Aspects of the invention are described as a method of control or manipulation of data, and may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for tangibly embodying information in a form readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

The following examples show information pertaining to mainframe installation packages before and after conversion to XML as described for one embodiment of this disclosure. Those of ordinary skill in the art will recognize this content and the conversion process is clear from the result so a detailed explanation is beyond the scope of this disclosure. One example of content representing a particular Function Modification ID (FMID) prior to converting it to XML is as follows:

TABLE 1

Example FMID information

++FUNCTION(BBYDZ28) FILES(10) REWORK(2006137).
++VER(BMCS,BOOL)
DELETE(BBYDZ27).
++JCLIN RELFILE(1).
++MOD(BBDWCEE0) RELFILE(2) DISTLIB(AYDZMOD).
++MOD(BBDWCE0A) RELFILE(2) DISTLIB(AYDZMOD).
++MAC(BBDACE0A) RELFILE(3) DISTLIB(ABBACTDF) SYSLIB(BBACTDEF).
++MAC(BBDACE02) RELFILE(3) DISTLIB(ABBACTDF) SYSLIB(BBACTDEF).
++MAC(BBDACE10) RELFILE(3) DISTLIB(ABBACTDF) SYSLIB(BBACTDEF).
++MAC(BACMMR10) RELFILE(4) DISTLIB(ABBCLIB) SYSLIB(BBCLIB).
++MAC(BACMMR14) RELFILE(4) DISTLIB(ABBCLIB) SYSLIB(BBCLIB).
++MAC(BACMMR17) RELFILE(4) DISTLIB(ABBCLIB) SYSLIB(BBCLIB).
++MAC(BAMMR30) RELFILE(5) DISTLIB(ABBMLIB) SYSLIB(BBMLIB).
++MAC(BBDAA10) RELFILE(5) DISTLIB(ABBMLIB) SYSLIB(BBMLIB).
++MAC(BBDAA11) RELFILE(5) DISTLIB(ABBMLIB) SYSLIB(BBMLIB).
++MAC(BBDTDCDL) RELFILE(6) DISTLIB(ABBPARM) SYSLIB(BBPARM).
++MAC(BBDTLTDC) RELFILE(6) DISTLIB(ABBPARM) SYSLIB(BBPARM).
++MAC(BAHMMR10) RELFILE(7) DISTLIB(ABBPLIB) SYSLIB(BBPLIB).
++MAC(BAHMMR14) RELFILE(7) DISTLIB(ABBPLIB) SYSLIB(BBPLIB).
++MAC(BAIMMRJT) RELFILE(8) DISTLIB(ABBSAMP) SYSLIB(BBSAMP).
++MAC(BBD9DSIV) RELFILE(8) DISTLIB(ABBSAMP) SYSLIB(BBSAMP).
++MAC(BBD9MAIV) RELFILE(8) DISTLIB(ABBSAMP) SYSLIB(BBSAMP).
++MAC(BBD0MAIV) RELFILE(9) DISTLIB(ABBSRC) SYSLIB(BBSRC).
++MAC(BBDZAC2A) RELFILE(10) DISTLIB(ABBVDEF) SYSLIB(BBVDEF).
++MAC(BBDZAC2B) RELFILE(10) DISTLIB(ABBVDEF) SYSLIB(BBVDEF).
++MAC(BBDZAC2C) RELFILE(10) DISTLIB(ABBVDEF) SYSLIB(BBVDEF).
//SYSUT1 DD DISP=SHR,DSN=MMR28.BASE.JCLIN(BBM9Q700)
// DD DISP=SHR,DSN=MMR28.BASE.JCLIN(BBM9Q6W0)
// DD DISP=SHR,DSN=MMR28.BASE.JCLIN(BBM9Q6F0)

The above content may be converted to XML for embedding in a fingerprint library and after the conversion process may look like the following:

TABLE 2

FMID information converted to XML

<FUNCTION> BBYDZ28
 <DESCRIPTION>MAINVIEW for z/OS</DESCRIPTION>
 <VERSION>2.08.00</VERSION>
 <LIBRARY>AYDZMOD
  <MODULE>BBDWCEE0</MODULE>
  <MODULE>BBDWCE0A</MODULE>
 </LIBRARY>
 <LIBRARY>BBACTDEF
  <ELEMENT>BBDACE0A</ELEMENT>
  <ELEMENT>BBDACE02</ELEMENT>
  <ELEMENT>BBDACE10</ELEMENT>
 </LIBRARY>
 <LIBRARY>BBCLIB
  <ELEMENT>BACMMR10</ELEMENT>
  <ELEMENT>BACMMR14</ELEMENT>
  <ELEMENT>BACMMR17</ELEMENT>
 </LIBRARY>
 <LIBRARY>BBMLIB
  <ELEMENT>BAMMR30</ELEMENT>
  <ELEMENT>BBDAA10</ELEMENT>
  <ELEMENT>BBDAA11</ELEMENT>
 </LIBRARY>
 <LIBRARY>BBPARM
  <ELEMENT>BBDTDCDL</ELEMENT>
  <ELEMENT>BBDTLTDC</ELEMENT>
  <ELEMENT>BAHMMR10</ELEMENT>
 </LIBRARY>
 <LIBRARY>BBPLIB
  <ELEMENT>BAHMMR10</ELEMENT>
  <ELEMENT>BAHMMR14</ELEMENT>
 </LIBRARY>
 <LIBRARY>BBSAMP
  <ELEMENT>BAIMMRJT</ELEMENT>
  <ELEMENT>BBD9DSIV</ELEMENT>
  <ELEMENT>BBD9MAIV</ELEMENT>

TABLE 2-continued

FMID information converted to XML

```
 </LIBRARY>
 <LIBRARY>BBSRC
  <ELEMENT>BBD0MAIV</ELEMENT>
 </LIBRARY>
 <LIBRARY>BBVDEF
  <ELEMENT>BBDZAC2A</ELEMENT>
  <ELEMENT>BBDZAC2B</ELEMENT>
  <ELEMENT>BBDZAC2C</ELEMENT>
 </LIBRARY>
 <LIBRARY>BBLINK
  <LOADMODULE>BBM9Q700</LOADMODULE>
  <LOADMODULE>BBM9Q6W0</LOADMODULE>
  <LOADMODULE>BBM9Q6F0</LOADMODULE>
 </LIBRARY>
</FUNCTION>
```

One example of content representing a particular PTF prior to converting it to XML is as follows:

TABLE 3

Example PTF information

```
++PTF(BPY8100) REWORK(08036000).
++VER(BMCS,BOOL)
 FMID(BBYDZ28)
 SUP(BAY7763)
 PRE(BPY7351,
 BPY7971,
 BPY7995).
++IF FMID(BBYAA28) THEN REQ(BPY8101)
/* PROBLEM DESCRIPTION(S):
BAY7763 - ENHANCE THE LPARSTAT, LPARSTAR, AND
LPARSTAZ VIEWS TO SHOW THE AMOUNT OF STORAGE
ASSIGNED TO EACH LPAR AND SHOW THE TOTAL
ALLOCATED STORAGE ON THE LPARCEC VIEW
COMPONENT: BBYDZ28
APARS FIXED: BAY7763
TECHNICAL DESCRIPTION:
Information in the LPAR views should include the amount of storage
allocated to each LPAR.
DOCUMENTATION:
 LAST UPDATED: 05.FEB.08 10:46:48 BMVKEM4 */.
++MOD(BBMWCE04) DISTLIB(AYDZMOD) LEPARM(RENT,REFR).
++MOD(BBM0DC25) DISTLIB(AYDZMOD) LEPARM(RENT,REFR).
++MOD(BBM5CE04) DISTLIB(AYDZMOD) LEPARM(RENT,REFR).
++MOD(BBM8CE04) DISTLIB(AYDZMOD) LEPARM(RENT,REFR).
++MAC(BBMACE04) DISTLIB(ABBACTDF) SYSLIB(BBACTDEF).
++MAC(BBDZAZ10) DISTLIB(ABBVDEF) SYSLIB(BBVDEF).
++MAC(BBDZAZ13) DISTLIB(ABBVDEF) SYSLIB(BBVDEF).
++MAC(BBMZAD10) DISTLIB(ABBVDEF) SYSLIB(BBVDEF).
++MOD(BBM0CE04) DISTLIB(AYDZMOD) LEPARM(RENT,REFR).
```

The above content may be converted to XML for embedding in a fingerprint library and after the conversion process may look like the following:

TABLE 4

Example PTF information converted to XML

```
<PTF>BPY8100
 <FMID>BBYDZ28</FMID>
 <DATE>05.FEB.08</DATE>
 <TIME>10:46:48</TIME>
 <AUTHOR>BMVKEM4</AUTHOR>
 <PROBLEM DESCRIPTION>
 BAY7763 - ENHANCE THE LPARSTAT, LPARSTAR, AND
 LPARSTAZ VIEWS TO SHOW THE AMOUNT OF STORAGE
 ASSIGNED TO EACH LPAR AND SHOW THE TOTAL
 ALLOCATED STORAGE ON THE LPARCEC VIEW
 </PROBLEM DESCRIPTION>
 <APARS FIXED>BAY7763</APARS FIXED>
 <TECHNICAL DESCRIPTION>
 Information in the LPAR views should include the amount of storage
 allocated to each LPAR.
 </TECHNICAL DESCRIPTION>
 <LIBRARY>AYDZMOD
  <MODULE>BBMWCE04</MODULE>
  <MODULE>BBM0DC25</MODULE>
  <MODULE>BBM5CE04</MODULE>
  <MODULE>BBM8CE04</MODULE>
 </LIBRARY>
 <LIBRARY>BBACTDEF
  <ELEMENT>BBMACE04</ELEMENT>
  <ELEMENT> BBDZAZ10</ELEMENT>
 </LIBRARY>
 <LIBRARY>BBVDEF
  <ELEMENT>BBDZAZ10</ELEMENT>
  <ELEMENT>BBDZAZ13</ELEMENT>
  <ELEMENT>BBMZAD10</ELEMENT>
 </LIBRARY>
 <LIBRARY>AYDZMOD
  <MODULE>BBM0CE04</MODULE>
 </LIBRARY>
</PTF>
```

One example of content representing a particular APAR prior to converting it to XML is as follows:

TABLE 5

Example APAR information

```
++APAR(BAY7763).
++VER(BMCS,BOOL)
 FMID( )
 /*
PROBLEM CATEGORY: ENHANCEMENT
CHANGE CATEGORY: ENVIRONMENTAL ADAPTATION
ERROR SOURCE: NONE
PROBLEM TITLE:
ENHANCE THE LPARSTAT, LPARSTAR, AND LPARSTAZ VIEWS TO SHOW THE
AMOUNT OF STORAGE ASSIGNED TO EACH LPAR AND SHOW THE TOTAL
ALLOCATED STORAGE ON THE LPARCEC VIEW
SYMPTOM DESCRIPTION:
Information in the LPAR views should include the amount of storage (central and
expanded) allocated to each LPAR.
ANALYSIS:
The amount of storage allocated to each active LPAR is available, but was not
```

TABLE 5-continued

Example APAR information being collected and stored in the LPAR history record(LPRE) by the LPAR Data Collector BM0DC25).
ACTION:
Save the current storage allocation for each LPAR in the LPRE. For non-z/Arch LPARs, central and expanded storage will be added together.
Although the amount of storage is the number of megabytes allocated to the LPAR, the number can still become quite large and will be stored in single precision floating point, resulting in some loss of precision for LPARs that have in excess of 16 million megabytes (16 terabytes) of storage assigned to them. The LPARSTAT, LPARSTAR, and LPARSTAZ views will have a column added that will show the current assigned storage size.
The LPARCEC view will show the total amount of storage allocated to all active CP LPARs.
CIRCUMVENTIONS:
None.
DOCUMENTATION:
  None.
  INTERNAL DOCUMENTATION:
  After the Code Review, the additional processor line type (i.e., other than CP) was removed from the LPARCEC view per development request.
  TEST PLAN:
  Compare the LPARSTAT, LPARSTAR, LPARSTAZ, and LPARCEC views between the before and after environments. The additional column containing the allocated (or total) storage will be to the right.
  Request field help on the new fields to verify it.
  On the LPARCEC view, the total amount of allocated storage on the LPARCEC view for the CP processor type should be the sum of the allocated storage shown in the LPARSTAx views.
  Because this is newly collected data, these values will be blank when looking at historical data collected before installing this SPE.
  The CMF LPAR Cluster Section of the CPU Utilization report also shows the amount of storage. This can be used for comparison and validation.
LAST UPDATED: 05.FEB.08 10:42:24 BMVKEM4 */.

The above content may be converted to XML for embedding in a fingerprint library and after the conversion process may look like the following:

TABLE 6

Example APAR information converted to XML

```
<APAR>BAY7763
<FMID>BBYDZ28</FMID>
<DATE>05.FEB.08</DATE>
<TIME>10:42:24</TIME>
<AUTHOR>BMVKEM4</AUTHOR>
<DESCRIPTION>
ENHANCE THE LPARSTAT, LPARSTAR, AND LPARSTAZ VIEWS
TO SHOW THE AMOUNT OF STORAGE ASSIGNED TO EACH
LPAR AND SHOW THE TOTA LALLOCATED STORAGE ON THE
LPARCEC VIEW
</DESCRIPTION>
<ZAP>BBLINK
<LOADMODULE>BBM9Q700</LOADMODULE>
</ZAP>
```

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. For instance, illustrative flow chart steps or process steps of FIGS. 1-5 may perform the identified steps in an order different from that disclosed here. Alternatively, some embodiments may combine the activities described herein as being separate steps. Similarly, one or more of the described steps may be omitted, depending upon the specific operational environment the method is being implemented in. In addition, acts in accordance with FIGS. 1-5 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices, sometimes called computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices. Also, XML was discussed in the embodiments disclosed herein. However, those of ordinary skill in the art will recognize that version information may be maintained as structured text, binary object data (e.g., binary data structures), HTML or other forms of storing data.

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A mainframe computer comprising:
a programmable control device; and
a product build process,
wherein the programmable control device is programmed to execute the product build process to perform the acts of:
collecting product function attributes from a product build definition pertaining to an installation bundle to use as input to a system modification program extend (SMP/E) application,
detecting product function attributes information from the product build process,
converting at least a portion of the collected and detected attributes information into a structured format,
updating a fingerprint library with the converted information, and
creating an installation bundle including the fingerprint library in a format acceptable as input to the SMP/E application.

2. The mainframe computer of claim 1 wherein the installation bundle comprises a program temporary fix (PTF).

3. The mainframe computer of claim 1 wherein the installation bundle comprises a complete product.

4. The mainframe computer of claim 1 wherein the installation bundle comprises an authorized program analysis report (APAR).

5. The mainframe computer of claim 1 wherein the act of updating performed by the programmable control device comprises creating the fingerprint library for embedding the converted information.

6. The mainframe computer of claim 1 wherein the act of updating performed by the programmable control device comprises editing the fingerprint library to insert the converted information.

7. The mainframe computer of claim 1 wherein the structured format is extensible markup language (XML).

8. The mainframe computer of claim 1 wherein the structured format is a structured text file.

9. The mainframe computer of claim 1 wherein the structured format is binary data.

10. The mainframe computer of claim 1 wherein the acts of collect, detect, convert and update are performed by the programmable control device, if and only if, a populated fingerprint library is not already present in the installation bundle.

11. The mainframe computer of claim 1 wherein a separate fingerprint library is updated, by the programmable control device, per program temporary fix (PTF) or authorized program analysis report (APAR) included in the installation bundle.

12. A method of maintaining product function attributes information across multiple logical partitions (LPARs) of a mainframe environment comprised of one or more mainframe computers, the method comprising:
on one or more mainframe computers comprising one or more LPARs and one or more programmable processing units configured to execute programs and updates via installation bundles;
receiving, on a second LPAR, a copy of a result of installing an installation bundle on a first LPAR, the copy including a fingerprint library, wherein the first LPAR was installed via a system modification program extend (SMP/E) application wherein the second LPAR becomes configured with an update from the installation bundle installed on the first LPAR;
querying files, on the second LPAR, to detect one or more fingerprint libraries that include the fingerprint library of the copy;
extracting information from the one or more fingerprint libraries; and
returning at least a portion of the extracted information for presentation to a system administrator.

13. The method of claim 12 wherein the returned information is provided to another process for further processing.

14. The method of claim 12 wherein the extracted information pertains to product function attributes information embedded in the one or more fingerprint libraries.

15. The method of claim 12 wherein the extracted information comes from a standalone fingerprint library.

16. The method of claim 12 wherein the extracted information comes from a fingerprint library portion embedded into a non-fingerprint library.

17. The method of claim 12 wherein the extracted information was inserted at product build time.

18. The method of claim 12 wherein the extracted information was inserted at initial product installation time.

19. A non-transitory computer readable medium with instructions for a programmable control device stored thereon wherein the instructions cause the programmable control device to perform the method of claim 12.

20. A networked computer system comprising:
a plurality of logical partitions (LPARs) existing on one or more communicatively coupled physical mainframe computers;
a first LPAR of the plurality of LPARs comprising a system modification program extend (SMP/E) application; and
a second LPAR of the plurality of LPARs maintained exclusive of the SMP/E application, at least one of the plurality of LPARs being programmed to perform at least a portion of the method of claim 12 wherein the entire method of claim 12 is performed collectively by the plurality of LPARs.

* * * * *